July 7, 1931.  J. J. BARRY  1,813,479
SKINNING MACHINE
Filed May 22, 1929
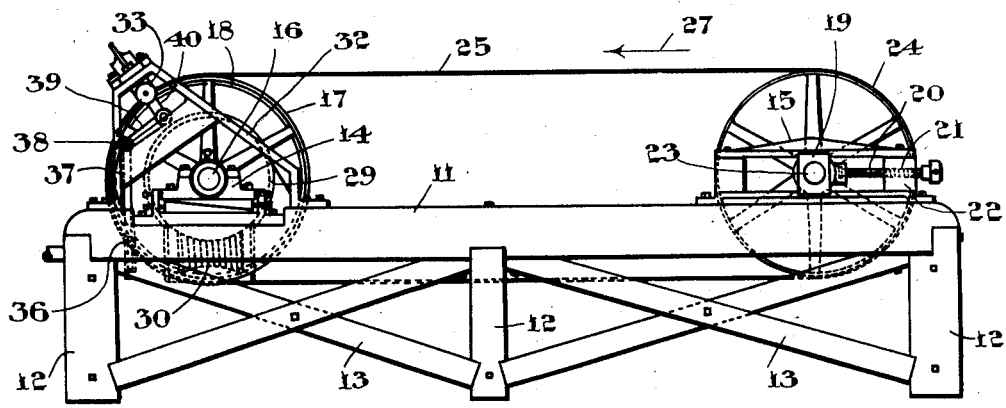
FIG.1
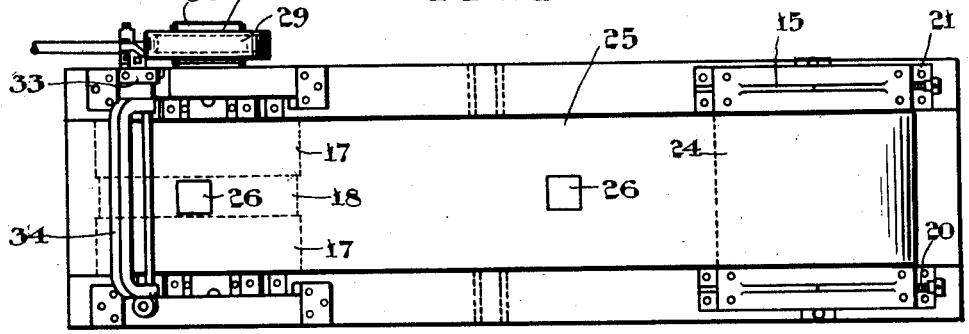
FIG.2
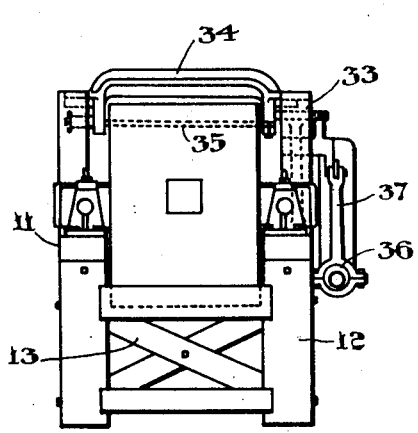
FIG.3
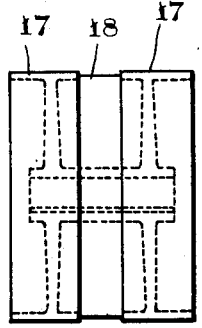
FIG.5
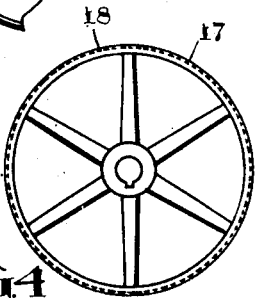
FIG.6
FIG.4
INVENTOR
JAMES. J. BARRY
BY Featherstonhaugh & Co
ATTORNEYS Patented July 7, 1931

1,813,479

UNITED STATES PATENT OFFICE

JAMES J. BARRY, OF HALIFAX, NOVA SCOTIA, CANADA, ASSIGNOR TO MARITIME FISH CORPORATION LIMITED, OF MONTREAL, CANADA

SKINNING MACHINE

Application filed May 22, 1929, Serial No. 365,108, and in Canada January 22, 1929.

This invention relates to new and useful improvements in fish skinning machines and the object of the invention is to provide a machine which will be easily maintained, and safe and efficient in operation.

According to my invention, I provide an endless belt having means formed therein for holding and positioning the fish. The belt passes around a set of pulleys between one pair of which is mounted means adapted to cooperate with the belt to grip the tail and to hold the fish on the belt during the skinning operation. Positioned above the belt is power driven means for efficiently skinning the fish. The belt travels around the pulleys and is driven from the same source as the skinning medium.

In the drawings which illustrate one form of my invention:

Figure 1 is a side elevation of one form of my improved skinning machine.

Figure 2 is a plan view of the machine shown in Figure 1.

Figure 3 is an end view of the machine shown in Figure 1.

Figure 4 is an end elevation of one set of the return pulleys.

Figure 5 is a side elevation of the pulleys shown in Figure 4.

Figure 6 is an enlarged partial side elevation of the belt and the gripping pulley, near the skinning mechanism showing the manner of gripping the fish.

Referring more particularly to the drawings, 11 designates the sills of the machine which are supported on legs 12 and held together by suitable bracing members 13. Mounted on the said sills in spaced relation are the bearings 14 and the guides 15. A shaft 16 is rotatably mounted in the bearings 14 and secured to said shaft are the set of pulleys 17 and 18, a detail of which is shown in Figures 4 and 5. The pulleys 17 are made slightly larger in diameter than the pulley 18 which is positioned approximately in the centre of the machine. Bearing blocks 19 adapted to slide in the guides 15 are each controlled by means of a screw 20 rotatably held in one end of the block. The screws pass through threaded apertures 21 in the end 22 of the guides. A shaft 23 is rotatably mounted in the bearing blocks and secured to said shaft is the return pulley or pulleys 24. An endless belt 25 is provided and this belt is stretched partially around and between the gripping pulleys 17 and 18 and the return pulleys 24. Square holes 26 are formed in the belt and these holes are so positioned that they align with the pulley 18. The belt travels in the direction of arrow 27, and the fish designated 28 is held in the manner shown in Figure 6, that is, the tail is gripped between the pulley 18 and the underside of the belt while the body of the fish is lying on the top of the belt with the skin in contact therewith. It will be understood that the fish shown has already been filleted and the fleshy part of the fish is facing upwardly on the belt.

The shaft 16 extends beyond one of its supporting bearings and secured to said shaft is the worm wheel 29. This worm wheel is driven from a worm 30 secured to a shaft driven from any suitable source and mounted in supports in the worm gear casing 31.

Mounted on the sills are the bearings 32 which support the bearings 33 of the knife holder 34. A knife or saw 35 is detachably secured to the holder in the well known manner. The knife is held in proximity to, but clear of the belt, a distance equal to the thickness of the skin of the fish under treatment. The holder reciprocates and oscillates on its bearings and the reciprocating and oscillating motions are produced by means of an eccentric 36 secured to the driving shaft, said eccentric working an eccentric rod 37 which is pivotally connected to one end 38 of a lever 39, the other end of which is connected to by a bar 40 extending outwardly from the holder.

In operation, the filleted fish are laid with the skinned covered surfaces on the belt. The belt is made of metal. The tail of the fish is pressed through the apertures in the belt. The belt travels in the direction indicated and the tail is caught between the periphery of the pulley 18 and the underside of the belt. The belt carries the fish towards the knife which has a slight reciprocating as well as an oscillating movement through the medium of the eccentric. This acts on the flesh of the fish to cut the flesh clear of the skin. The flesh once cut drops clear of the belt and the skin is carried to the underside until the tail is freed from contact with the pulley 18. The weight of skin will pull the tail through the aperture so that it may drop into a suitable receptacle.

The device is very simple in operation and provides a means for skinning fish in an efficient manner with the minimum amount of handling.

What I claim is:

1. In a fish skinning machine, an endless conveyor belt, pulleys for supporting said belt, means for tensioning the belt, said belt having slots formed therein adapted to hold the tail of the fish against one of the pulleys and prevent relative movement of the fish during the skinning of same and a knife positioned above the pulleys at one end of the machine and adapted to cut the flesh clear of the skin during the movement of the belt.

2. In a fish skinning machine, an endless belt, pulleys for supporting same, said belt having slots formed therein to receive the tails of the fish to be skinned and hold the fish against one of the pulleys at one end of the machine, said slots being arranged so that when the belt is on the underside of the pulleys and clear of same, the skins will pull themselves clear of the slot.

3. In a fish skinning machine, the combination of an endless traveling belt provided with a plurality of spaced openings through each of which the tail portion of a fish is adapted to be passed so that the body of the fish lies upon the outer surface of the belt with the tail of the fish extending beneath the inner surface of the belt, a knife positioned above the belt at one end thereof, and means positioned at the same end of the belt for clamping the tail of the fish carried by the belt to the under side of said belt while the fish is being operated upon by said knife.

In witness whereof, I have hereunto set my hand.

JAMES J. BARRY.